(12) United States Patent
Mark et al.

(10) Patent No.: US 7,584,101 B2
(45) Date of Patent: Sep. 1, 2009

(54) SYSTEM FOR AND METHOD OF AUTOMATED QUALITY MONITORING

(75) Inventors: Lawrence Mark, Trumbull, CT (US); Geoffrey J. Giordano, Monroe, CT (US); Robert Scarano, Monroe, CT (US); Kori Lambert, Stamford, CT (US)

(73) Assignee: SER Solutions, Inc., Dulles, VA (US)

( * ) Notice: Subject to any disclaimer, the term of this patent is extended or adjusted under 35 U.S.C. 154(b) by 709 days.

(21) Appl. No.: 10/923,038

(22) Filed: Aug. 23, 2004

(65) Prior Publication Data

US 2005/0114133 A1 May 26, 2005

Related U.S. Application Data

(60) Provisional application No. 60/496,916, filed on Aug. 22, 2003.

(51) Int. Cl.
*G10L 15/00* (2006.01)

(52) U.S. Cl. ........................ 704/251; 704/270; 704/246; 379/88.13; 707/5; 707/6

(58) Field of Classification Search ................ 704/270, 704/500, 251, 246; 379/265.07, 88.13; 707/5, 707/6
See application file for complete search history.

(56) References Cited

U.S. PATENT DOCUMENTS

| | | | |
|---|---|---|---|
| 5,535,256 A * | 7/1996 | Maloney et al. | ............. 379/309 |
| 5,600,831 A | 2/1997 | Levy | |
| 5,638,489 A | 6/1997 | Tsuboka | |
| 5,649,068 A | 7/1997 | Boser et al. | |
| 5,671,333 A | 9/1997 | Catlett et al. | |
| 5,675,710 A | 10/1997 | Lewis | |
| 5,822,401 A * | 10/1998 | Cave et al. | ................ 379/32.02 |
| 5,864,855 A | 1/1999 | Ruocco et al. | |
| 5,884,259 A | 3/1999 | Bahl et al. | |
| 6,061,652 A | 5/2000 | Tsuboka et al. | |
| 6,064,963 A * | 5/2000 | Gainsboro | ................... 704/270 |
| 6,073,103 A | 6/2000 | Dunn et al. | |
| 6,185,527 B1 | 2/2001 | Petkovic et al. | |
| 6,219,643 B1 * | 4/2001 | Cohen et al. | ................. 704/257 |
| 6,243,676 B1 * | 6/2001 | Witteman | ................... 704/243 |

(Continued)

FOREIGN PATENT DOCUMENTS

EP 0 833 489 4/1998

OTHER PUBLICATIONS

Nasukawa et al. "Text Analysis and Knowledge Mining System," IBM Systems Journal, vol. 40, No. 4, 2001.

(Continued)

*Primary Examiner*—Daniel D Abebe
(74) *Attorney, Agent, or Firm*—DLA Piper LLP US

(57) ABSTRACT

A system and method according to the present invention automates call monitoring activities to evaluate and directly improve agent-customer interactions. Rather than listening to an entire call or monitoring only a small fraction of all the calls made in the contact center, the system performs highly accurate, automated evaluations of all customer interactions. By automating the time-consuming aspect of monitoring calls, the system empowers contact center operators to address quality issues, more accurately measure, coach and reward agents, and identify business-critical trends.

10 Claims, 4 Drawing Sheets

U.S. PATENT DOCUMENTS

| | | | |
|---|---|---|---|
| 6,249,765 B1 * | 6/2001 | Adler et al. | 704/500 |
| 6,263,049 B1 * | 7/2001 | Kuhn | 379/32.01 |
| 6,278,772 B1 * | 8/2001 | Bowater et al. | 379/88.13 |
| 6,345,252 B1 | 2/2002 | Beigi et al. | |
| 6,404,856 B1 | 6/2002 | Wilcox | |
| 6,408,064 B1 * | 6/2002 | Fedorov et al. | 379/265.06 |
| 6,408,270 B1 | 6/2002 | Garber | |
| 6,434,520 B1 | 8/2002 | Kanevsky et al. | |
| 6,542,602 B1 | 4/2003 | Elazar | |
| 6,603,854 B1 | 8/2003 | Judkins et al. | |
| 6,603,921 B1 | 8/2003 | Kanevsky | |
| 6,633,845 B1 | 10/2003 | Logan et al. | |
| 6,697,796 B2 * | 2/2004 | Kermani | 707/3 |
| 7,020,612 B2 | 3/2006 | Tamura | |
| 7,054,812 B2 | 5/2006 | Charlesworth et al. | |
| 7,096,218 B2 | 8/2006 | Schirmer et al. | |
| 7,177,795 B1 | 2/2007 | Chen et al. | |
| 7,263,484 B1 | 8/2007 | Cardillo | |
| 2001/0040942 A1 | 11/2001 | Glowny et al. | |
| 2001/0049601 A1 | 12/2001 | Kroeker et al. | |
| 2002/0046029 A1 | 4/2002 | Tamura | |
| 2002/0051522 A1 | 5/2002 | Merrow et al. | |
| 2002/0055950 A1 * | 5/2002 | Witteman | 707/500.1 |
| 2002/0147592 A1 | 10/2002 | Wilmot et al. | |
| 2002/0156776 A1 | 10/2002 | Davallou | |
| 2002/0161570 A1 | 10/2002 | Loofbourrow et al. | |
| 2003/0048882 A1 | 3/2003 | Smith | |
| 2003/0083876 A1 | 5/2003 | Lin | |
| 2003/0110032 A1 | 6/2003 | Seide | |
| 2004/0024599 A1 | 2/2004 | Deisher | |
| 2004/0034649 A1 * | 2/2004 | Czarnecki et al. | 707/102 |
| 2004/0249650 A1 * | 12/2004 | Freedman et al. | 705/1 |
| 2007/0011008 A1 * | 1/2007 | Scarano et al. | 704/254 |
| 2007/0083370 A1 * | 4/2007 | Scarano et al. | 704/254 |

OTHER PUBLICATIONS

Supplemental European Search Report dated Jun. 26, 2008, issued in corresponding EP Application 04781960.2.
http:/www.fast-talk.com (3 pages), archived Aug. 16, 2004.
http://www.aurix.com (30 pages), archived Jul. 3, 2004.
International Search Report issued May 31, 2005 for corresponding International Application PCT/LISO4/27372.
Written Opinion issued May 31, 2005 for corresponding International Application PCT/USO4/27372.
International Search Report issued May 25, 2004 for related International Application PCT/US03/33042.
Written Opinion issued Aug. 3, 2004 for related International Application PCT/US03/33042.
Clements et al., Phonetic Searching Applied to On-Line Distance Learning Modules, IEEE Signal Processing Society 10th Digital Signal processing Workshop, Oct. 13-16, 2002, pp. 186-191.
Li et al., "MOQL: A Multimedia Object Query Language." Third International Workshop on Multimedia Information Systems, Como, Italy, Sep. 1996, 10 pages.
International Preliminary Examination Report issued Mar. 18, 2005 for related International Application PCT/US03/33042.
Supplemental European Search Report issued in related European Application 03 80 9142 on Dec. 5, 2005.
Clements et al., "Phonetic Searching of Digital Audio," 2002 (10 Pages).
Geoffrey Giordano, "integrating a Call Logger Into the Modern Contact Center," Dec. 3, 2001, pp. 1-6.
Jeffrey Kingdon, "Computer Telephony Integration," Nov. 28, 2001, pp. 1-7.
International Search Report issued Jun. 2, 2004 for related International Application PCT/US03/33040.
Written Opinion issued Oct. 12, 2004 for related International Application PCT/US03/33040.
International Preliminary Report on Patentability issued Mar. 17, 2005 for related International Application PCT/US03/33040.
First Examination Report mailed in related Indian Application 282/MUMNP/2005.
Second Examination Report mailed Dec. 12, 2005 in related Indian Application 282/MUMNP/2005.
Supplemental European Search Report issued Dec. 5, 2005 in related European Application 03 77 4874.6.
European Office Action dated Dec. 11, 2006 in related European Application 03 774 874.6.
Steven Wartik, "Boolean Operations," in: Frakes et al. "Information Retrieval Data Structures & Algorithms," 1992 Prentice Hall pp. 264-268.
Examiner's Report issued in related Australian Application 2003301373 on Feb. 25, 2008.
Examiner's Report issued in related Australian Application 2003282940 on Aug. 6, 2008.
Notice of Allowance issued May 23, 2006 in related U.S. Appl. No. 10/687,703.
Advisory Action issued Oct. 12, 2005 in related U.S. Application 10/687,703.
Final Office Action issued Mar. 23, 2005 in related U.S. Appl. No. 10/687,703.
Office Action issued Aug. 2 2004 in related U.S. Appl. No. 10/687,703.
Office Action issued May 28, 2008 in related U.S. Appl. No. 11/590,772.
Office Action issued Feb. 1, 2008 in related U.S. Appl. No. 11/482,876.
First Examination Report mailed Jan. 5, 2006 in related Indian Application 283/MUMNP/2005.
Second Examination Report mailed Nov. 2, 2006 in related Indian Application 283/MUMNP/2005.
Final Office Action issued in U.S. Appl. No. 11/482,876 mailed Oct. 29, 2008.
European Search Report issued in EP 99 10 8354.4, mailed Dec. 8, 1999.
Carlos Reyes et al., "Clustering Technique for Random Data Classification" International Conference on Systems, Man and Cybernetics, US, New York, IEEE, pp. 316-321 (1995).
Mario Marchand et al., "A Convergence Theorem for Sequential Learning in Two-Layer Perceptrons", Europhysics Letters, vol. 11, No. 6, (7 pages) (1989).
International Search Report issued in International Application No. PCT/USO4/27372, mailed May 31, 2005.
Notice of Allowance issued in U.S. Appl. No. 10/687,702, mailed Jan. 19, 2006.
Final Office Action issued in U.S. Appl. No. 10/687,702, mailed Mar. 24, 2005.
Office Action issued in U.S. Appl. No. 10/687,702, mailed Oct. 6, 2004.
www.Nexida.com (44 pages), archived Jun. 3, 2004.
Final Office Action issued in U.S. Appl. No. 11/590,772, mailed Feb. 23, 2009.
"VorTecs Uses Fast-Talk to Power Intelligent Communication Solutions", http:web.archive.org/web/20030205104304/http://fast-talk.com/, pp. 1-3, archived Feb. 5, 2003.
Ellen Voorhees et al., "Vector Expansion in a Large Collection", Proceedings of the First Text Retreival Conference (TREC-1), pp. 343-351 (1993).

* cited by examiner

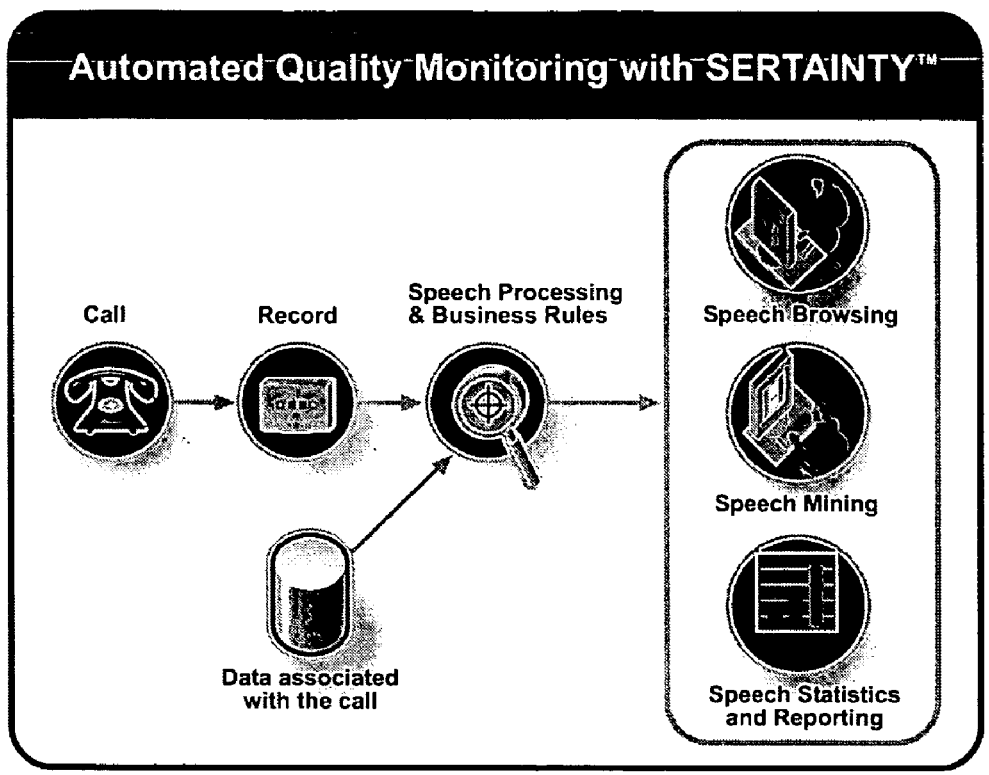
Figure 3
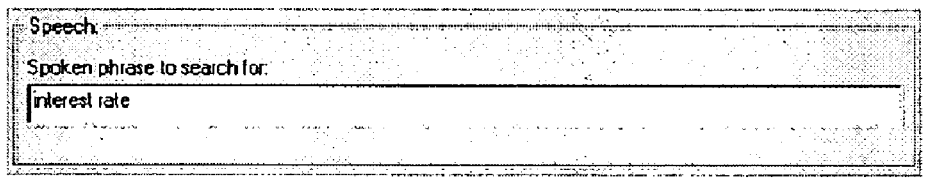
Figure 4
| Score | Offset | Phrase |
|---|---|---|
| 0.687534 | 00:06:57.0 | interest rate |
| 0.680347 | 00:07:47.780 | interest rate |
| 0.659097 | 00:04:39.200 | interest rate |
| 0.657535 | 00:07:30.280 | interest rate |
| 0.647847 | 00:07:35.100 | interest rate |
Figure 5

Speech:
Spoken phrase to search for:
interest rate @68

Figure 6

| Score | Offset | Phrase |
|---|---|---|
| 0.687534 | 00:06:57.0 | interest rate |
| 0.680347 | 00:07:47.780 | interest rate |

Figure 7

Speech:
Spoken phrase to search for:
+date of birth please @50 +last four numbers of your social @70

Figure 8

Speech:
Spoken phrase to search for:
-thank you for calling @50 +have a nice day @65

Figure 9

Speech:
Spoken phrase to search for:
+thank you for calling +my company | the company | our company

Figure 10

SYSTEM FOR AND METHOD OF AUTOMATED QUALITY MONITORING

CROSS-REFERENCE TO RELATED APPLICATIONS

The present application is related to and claims priority of U.S. Provisional Application No. 60/496,916 filed Aug. 22, 2003 which application is incorporated herein by reference in its entirety.

BACKGROUND OF THE INVENTION

1. Field of the Invention

The Invention relates to the field of call centers, and more particularly, to the surveillance of agents and the evaluation of tasks assigned thereto.

2. Description of Related Art

For many businesses, the primary interface between the company and its customers is the contact center. In this role as the "face" of the company, the contact center is a crucial component that directly affects the company's overall success. One negative customer experience can forever jeopardize the relationship.

To ensure that customers receive a high level of service, contact center operators typically employ quality managers who monitor a random sampling of calls. Such systems and methods are generally described in patents and patent applications in class 379, subclass 265.6 of the U.S. Patent and Trademark Office and International Class H04M 3/00. However, listening to a random sample is, at best, a compromise solution between the desired quality goal and the expense of a large staff of reviewers. To further illustrate the point, consider the following example scenario:

If a contact center monitors 5% of calls, and only 5% of those calls are bad or exceptionally good, then most of the calls being monitored are benign.

This example shows that the quality monitoring team spends the majority of their time listening to benign calls while the calls that most need to be reviewed are missed. Without a sufficiently large sample of calls, important trends may not be apparent.

The key then to an effective quality monitoring program is the ability to review 100% of calls, without the associated cost of additional staff. Accordingly, a need exists for a system and method for enhancing the monitoring of audio communications such as agent-customer interactions in connection with a call or contact center.

SUMMARY OF THE INVENTION

According to one aspect of the present invention, a system for monitoring a spoken language message includes an interface configured to capture the spoken language message. A speech processor is operational to parse a search expression and to formulate one or more target utterances. A speech engine is operational to search the spoken language message for one or more target utterances and, in response, provides search results identifying a location of any candidate utterances matching the target utterances together with confidence values indicating a certainty of each of the candidate utterances to respective ones of the target utterances. A speech processor is responsive to a search expression for identifying ones of the target utterances to the speech engine for analyzing the search results to determine whether a condition specified by the search expression is satisfied.

According another feature of the invention the speech processor may include logic for decoding a plurality of symbols into corresponding operators defining relationships specified by the rules. The parser may further operate to recognize a plurality of operators defining the rules, the operators selected from the set consisting of logical AND, logical OR, unitary negation, permutation, proximity and confidence.

According another feature of the invention a rules processor may be responsive to template information for providing enhanced confidence values based on a combination of respective ones of the utterance confidence values and the template information. The template information may include context information, the rules processor indicating conformity of the candidate utterances to relationship expectations defined by the template information to provide the enhanced confidence values.

According another feature of the invention the rules processor may be operational to determine a statistical distribution of time between adjacent ones of the candidate utterances and a statistical distribution of confidence values, and determine an enhanced confidence value based on a combination of the probability of the utterance confidence values returned from the speech engine, and a probability of the candidate utterance from an associated candidate utterance. The rules processor may further calculate a key state probability as $P(K|xs,xo)=P(xs)*P(xo)$ where $P(xs)$ is a probability of a confidence score and $P(xo)$ is the probability of the candidate utterance being at the correct offset from a related key state. Determination of the probability of a confidence score S may be expresses as $P(xs|S)=g(xS, S, S)$ and the probability of an offset O being correct as $P(xo|O)=g(xo, O, O)$ where g is a probability function.

According to another aspect of the invention, a method of monitoring a spoken language message includes steps of capturing the spoken language message; processing a search expression to identify target utterances; searching the spoken language message for the target utterances; providing search results including identifying a location of any candidate utterances matching the target utterances together with confidence values indicating a certainty of each of the candidate utterances to respective ones of the target utterances; and analyzing the search results to determine whether a condition specified by the search expression is satisfied.

BRIEF DESCRIPTION OF THE DRAWINGS

Other objects, features and advantages of the present invention will become apparent from the detailed description of the invention which follows, when considered in light of the accompanying drawings in which:

FIG. 3 is a block diagram of a system and associated functionalities of a contact center agent monitoring and analysis system according to an embodiment of the invention;

FIG. 4 is a screen shot of a data entry window used to input a target phrase and/or expression as the object of a search;

FIG. 5 is a search results display region showing identifying phrases found in a selected audio file or files responsive to a search request;

FIG. 6 is a screen shot of a data entry window used to input a target phrase and/or expression as the object of a search showing another example of a search expression;

FIG. 7 is another search results display region showing identifying phrases found in a selected audio file or files responsive to the search request of FIG. 6; and FIGS. 8-15 are a screen shots of a data entry windows used to input a target phrase and/or expression as the object of various search request examples as discussed in the present specification.

DETAILED DESCRIPTION OF THE INVENTION

Figure 1:
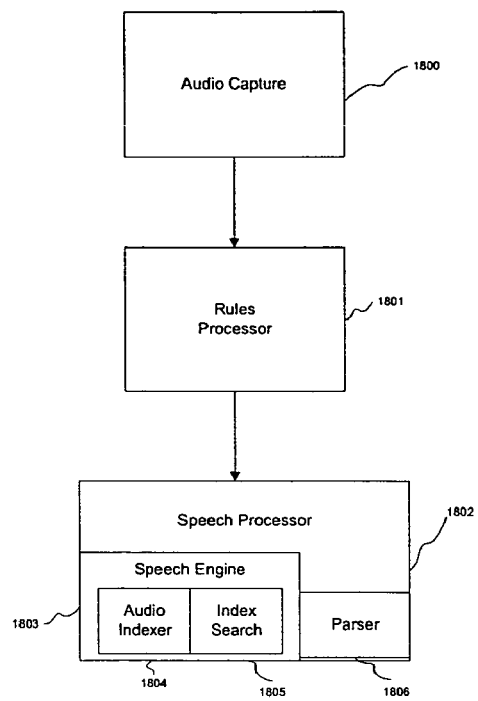
FIG. 1 is a schematic block diagram of an exemplary system for automated quality monitoring.

For many businesses, the primary interface between the company and its customers is the contact center. The nature of this relationship places a premium on ensuring quality call handling. However, quality monitoring has traditionally been a costly, time-consuming operation, and often a hit or miss proposition.

The preferred embodiment of the present system automates call monitoring activities to evaluate and directly improve agent-customer interactions. Rather than listening to an entire call or monitoring only a small fraction of all the calls made in the contact center, the system performs highly accurate, automated evaluations of all customer interactions. By automating the time-consuming aspect of monitoring calls, the system empowers contact center operators to address quality issues, more accurately measure, coach and reward agents, and identify business-critical trends.

The system combines advanced speech recognition technology and a robust rules engine to convert spoken words into retrievable data, making it possible for managers to monitor agent activities in near real time. As the system analyzes a call, it creates a database entry showing the results of the analysis. The system flags only those calls that actually need to be reviewed by a supervisor. Based on user-specified criteria, for example, supervisors may flag only those calls in which inappropriate language is used by an agent or customer.

The system reduces contact center operating costs by minimizing the need to manually monitor agent activities while increasing call quality by ensuring that Key Performance Indicators are being met. Simply put, contact center operators can monitor more calls in less time using fewer resources. As an added benefit, the system may help reduce attrition by enabling supervisors to spend more time coaching and developing agent skills with the net result of turning more average agents into top performers.

The system integrates with existing contact center call recording products and is customizable to meet user needs. The product is also highly scalable and can be distributed across multiple servers. In addition, the system may be sized to address the specific monitoring needs and standards of the contact center.

Glossary of Terms and Terminology

For convenience of reference, the abbreviations, term and terminology as used herein are defined as follows.

| | |
|---|---|
| ACD | Abbreviation for Automatic Call Distributor; a device that distributes incoming calls to a specific group of terminals. |
| ANI/CLID | Abbreviation for Automatic Number Identification or caller ID; a service that tells the recipient of a telephone call the telephone number of the person making the call. |
| Boolean | Having exactly two possible values, true or false. |
| CODEC | Abbreviation for coder/decoder; an integrated circuit or other electronic device combining the circuits needed to convert digital signals to and from analog (Pulse Code Modulation) form. |
| DNIS | Abbreviation for Dialed Number Identification Service; a telephone service that identifies for the receiver of a call the number that the caller dialed. A common feature of 800 and 900 lines. |
| Object | A self-contained entity that consists of both data and procedures to manipulate the data. |
| PCM | Abbreviation for Pulse Code Modulation; a method by which an audio signal is represented as digital data. |
| Phoneme | The smallest unit of speech that differentiates one utterance from another in any spoken language or dialect. |
| Phonetic | Of a self-contained entity that consists of both data and procedures to manipulate the data. Or pertaining to spoken language or speech sounds and based on the principle division of speech sounds into phonemes. |
| Search Phrase | A string of text that indicates a word or sequence of words that are searched for within an asset of audio. A search phrase can be composed of a single word, a sequence of words, or a partial sentence fragment. |
| VBA | Abbreviation for Visual Basic for Applications; Developed by Microsoft, a program that operates on objects representing the application and the entities it manipulates. |
| XML | Abbreviation for Extensible Markup Language; a programming language designed especially for Web documents. It allows designers to create their own customized tags, enabling the definition, transmission, validation, and interpretation of data between applications and between organizations. |

The following describes the preferred embodiment of the present invention. However, the invention itself is not limited to the preferred embodiment and encompasses variations and modifications as would be apparent to one of ordinary skill in the art.

Quality Assurance

With all calls subject to automated review in the preferred embodiment of the system, the system ensures that no poor customer interaction goes unnoticed. Similarly, the system empowers the quality monitoring team to focus on only those calls that necessitate action.

As the system analyzes a call, in one embodiment, it creates a database entry showing the results of the analysis. The statistics maintained in the database may be customizable within the rules engine, and may be aggregated on several levels such as per agent, per channel, per device, per location or on other levels of interest.

Productivity-Enhancing Technology

Preferred embodiments of the system may process calls into a time-encoded stream of probable phonemes, and then execute a set of rules against the processed audio and any data associated with the call. By processing the audio into a phonetic representation, rules treat the audio as data that can be searched very quickly for selected words, phrases or other utterances and sounds. Additionally, this embodiment of the present system can dynamically associate rules with one or more customer databases to help contact center managers make decisions based upon attributes of either the contact or the campaign being planned, conducted or evaluated.

A block diagram of a system for automated monitoring is shown in FIG. 1.

The audio capture system 1800 provides an interface to capture the spoken language message. The rules processor 1801 makes requests of the speech processor 1802 to create audio indices and to search these indices using search expressions. The rules processor also takes search results and applies templates and statistical methods to enhance the search results. The speech processor 1802 contains a parser 1806 to parse search expressions into components search phrases. The speech processor 1802 uses the speech engine 1803 to create audio indices and to search said indices. The speech engine 1803 consists of an audio indexer 1804 and an index searcher 1805.

Figure 2:
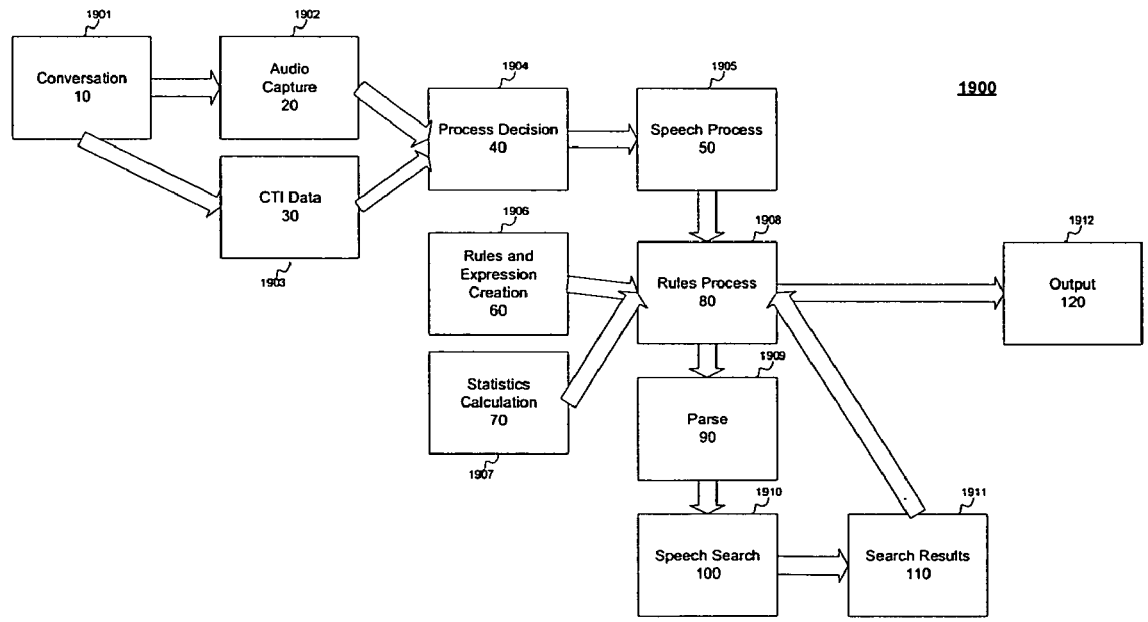
FIG. 2 is a flowchart of an exemplary method for automated quality monitoring.

FIG. 2 is a flow diagram showing the steps involved in the method for automated qualify monitoring. A conversation occurs at step 10 and the audio is captured at step 20. Optionally, at step 30 data associated with the call may also be captured. At step 40 a decision is made to process the audio and create a searchable index. At step 50 the index is created. At step 80 the rules are invoked and using the expressions created at step 60 one or more search expressions are sent to step 90 where they are parsed and the audio is searched at step 100. Search results are created for each search expression at step 110 and returned to the rules process at step 80. The rules process applies templates and statistics and creates an output at step 120 with the results of the automated analysis of the call.

A speech processor 1802 contains a parser 1806 and a speech engine 1803. The speech engine is further broken down into an audio indexer 1804 and an index searcher 1805. The rules processor 1801 first requests the speech processor 1802 to create an audio index of the spoken language. This is done by the audio indexer 1804 of the speech engine 1803. The rules processor 1801 then requests the speech processor 1802 to search for one or more search expressions. The speech processor 1802 uses the parser 1806 to decode the search expression into one or more search phrases. The searching is done by the index search 1805 of the speech engine 1803. Search results for each search expression are returned to the rules processor 1801.

A simplified diagram of a system for automated monitoring of call quality consistent with an embodiment of the invention is depicted in FIG. 3. As shown therein, the system integrates business knowledge with speech data to deliver a new data source for measuring and managing agents. Initially, a conversation or other audio information associated with a call is received and recorded. Both the audio information and other data associated with the call (e.g., call related information derived by the system such as call duration and data entered by an agent such as customer data, information requested, products ordered, etc.) are processed and appropriate Business Rules are applied. That is, the Business Rules created in the system are used to collect call statistics, issue alerts to the call monitor, and provide other functionality based on the conversation and associated data. For example, alerts may be used to draw attention to a phrase of interest, either positive or negative. Using a "speech browser" according to the invention, when an alert is selected the system may position the playback to the location in the call where the phrase was detected. For example, a Business Rule may be defined as:
If said: "Take your business elsewhere", then raise alert: "Agent attitude problem"

Routine interactions are normally accumulated in statistics so that supervisors can measure and monitor such interactions using reports.

Speech Processing and Rules

According to the preferred embodiment, the system may use commercially available audio processing search technology such as provided by Fast-Talk Communications (http://www.fast-talk.com) or 20/20 speech (http://www.aurix.com) to extract key words and phrases from agent calls. An audio search engine may implement a method including an algorithm for parsing and indexing phonetic patterns in speech. Speaker-independent phonetic-based search capabilities may be used. In this way accents, dialects and slang may be processed without significantly adversely affecting the accuracy or speed of the search. Additionally, phonetic indexing may accommodate an open vocabulary system that enables any search term including specialized terminology or names of people, places and organizations.

The Business Rules engine may be built around the Visual Basic for Applications (VBA) language. VBA provides significant flexibility and power for the power users. A rules wizard may also be provided to allow for the creation of simpler rules sets for users inexperienced with VBA. All capabilities of VBA may be made available from within the rules engine. An object used to support audio searching may be used within the rules engine. This object may have several properties, subroutines and functions to search the processed audio. Two key functions used to search the audio may be "Said" and "Search". Said is a Boolean function that searches the audio for a phrase at or above a given confidence level. Search is a function that returns a SpeechResults object, which is a collection of search results. Each item in the collection contains the phrase, the confidence at which it was found, and the offset within the audio at which it was found. Properties of the object can be manipulated to allow finer control of the audio search.

The search function within the speech engine may search for a single phrase. However, real-world business rules are often predicated on more than a simple search. A system according to the invention may use Search Grammar Notation (SGN), which permits search phrases to be made up of simple, compound or permuted expressions:

Search expressions may be used in the Business Rules and the Audio Mining Interface of a system according to the invention to specify the target words and phrases for which the system is searching. Search expressions may be specified in a Search Grammar Notation (SGN), which supports the following basic operations:
Simple, Compound, and Permuted search expressions.
Confidence Threshold for valid results.
Logical +, −, | and ( ) relationships between phrases.
Permutations of phrase-sequences.
Permutations of word-sequences within a phrase.
Proximity of phrase, i.e. the time between multiple phrases or the time between a fixed point such as the start or end of the call and a phrase.

Simple Search Expressions

The simplest search expression may be composed of only a single utterance, word or phrase (e.g. "speak with your manager") as depicted in FIG. 4. As shown, a search box displays the phrase "interest rate" as a target as manually or automatically entered or selected. According to one embodiment of the invention, for each phrase that is searched, a list of results are returned as shown in FIG. 5. Each result contains a confidence score (e.g., a value within a range of 0.0-1.0), a time-offset from the beginning of the call, and identification of the phrase identified.

Confidence Threshold

A target phrase search command may be modified by including a confidence threshold that specifies the lowest confidence score of a search-result that will be returned indicating identification of the target phrase. If a threshold is not given then a default confidence threshold value may be applied. Thresholds may be specified using the '@' character as shown in FIG. 6.

When a confidence threshold is given for a phrase explicitly in the statement, then it overrides any other default threshold values that may apply as shown in FIG. 7 wherein only those phrases having a detection confidence score value of at least the default or specified threshold are displayed, those falling below the threshold being eliminated from consideration.

+Operator

A search expression can be modified by the +operator to indicate that it is required, i.e., a logical AND. An expression may be established to evaluate to True if at least one positive search result is found. In a preferred embodiment, the +operator may be reserved use with compound expressions. In this embodiment, the +operator may be a "prefix" operator meaning it comes before the expression that it is modifying. In a preferred embodiment the +operator may be assumed by default for all expressions. Therefore, it is syntactically valid to use a +operator in a simple expression, but is equivalent to not using it at all in this embodiment since it is assumed by default. For example:

+interest rate is equivalent to interest rate

As the symbol "+" does not correspond to or is conventionally required to describe a particular utterance or phoneme, it can be readily reserved as a command or operator. Conversely, absent an intervening operator or command, a series of words may be interpreted as a single, continuous spoken utterance or phrase comprising a given ordered series of contiguous component words.

−Operator

An expression can be modified by the negation symbolized by the dash or "−" operator is used to indicate that the following expression should not be found in the search. If the expression evaluates to False then the −operator will negate the symbol to True and vice-versa. Typically, this negation operator may be reserved for use with compound expressions that have at least one other expression that is modified by the +operator. When the negation −operator is used as a "prefix" operator, it comes before the expression that it is modifying.

When using the −operator, it may respond in a special way if there are no other expressions given in the search string that use the +operator. If it is true for a given call that there are no results for a given search term, then the result that is returned may be called "(Empty)", may be given a confidence of 0.0 and a time offset of 00:00:00.0. Therefore, any simple expression that uses the −operator may yield "(Empty)" string result for a call if the given targeted search string is not found.

Compound Search Expressions

A compound search expression is a search string that is composed of more than one expression. These expressions may be strung together in a sequence as an expression list using the +/−operators or may be embedded within each other using the parenthetical "(" ")", and alternative or OR "|" operators. In a preferred embodiment, a compound search expression must evaluate to True for its results to be committed.

+Operator within a Compound Search Expression

The AND symbolized as a plus sign or "+" operator in a compound search expression may be used to indicate that the subsequent expression is required and must evaluate to true. The search-result for an expression evaluates to true if it has at least one positive search result (i.e., the specified search expression is found to exist in at least one location within a subject speech file). In a preferred embodiment if multiple expressions are chained together with the "+" operator then they must all evaluate to True for the whole expression to evaluate to True. A compound search expression is illustrated in FIG. 8 wherein the first phrase must be found at a confidence level of at least 50, the second phrase specified to be found with a confidence level of a least 80, for a true or positive result (e.g., for its results to be committed). In the present illustration, the given expression indicates that at least one result from "date of birth" and one result from "last four numbers of your social" are required for the expression to evaluate to True.

−Operator within a Compound Search Expression

The negation or "−" operator in a compound search expression may be used to indicate that the expression that follows the operator is excluded and must evaluate to false. It is equivalent to negating the evaluation of the expression. For example, with reference to FIG. 9, the expression may be used to indicate that there should be no results for "thank you for calling" and at least one valid result for "have a nice day" found within the file being examined.

|Operator

In a preferred embodiment, the "OR" symbolized as a vertical bar or "|" operator in a compound search expression always operates on two adjacent expressions and evaluates to True if either (or both) the two expressions evaluate to True. Multiple expressions may be chained together using the | operator and will be evaluated to True if any of the constituent expressions evaluates to True. FIG. 10 shows an expression in which the phrases "thank you for calling" must be found in combination with one or more of the phrases "my company", "the company" and "our company" at some default confidence level.

( ) Parentheses

Figure 11:
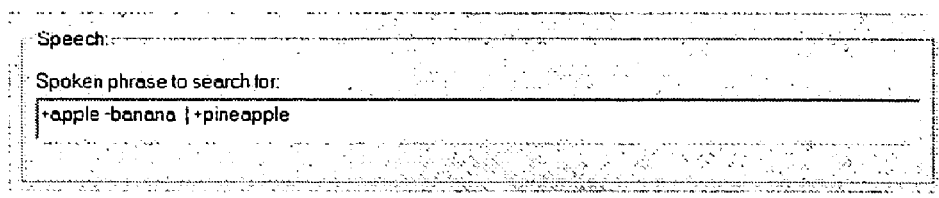
Figure 12:
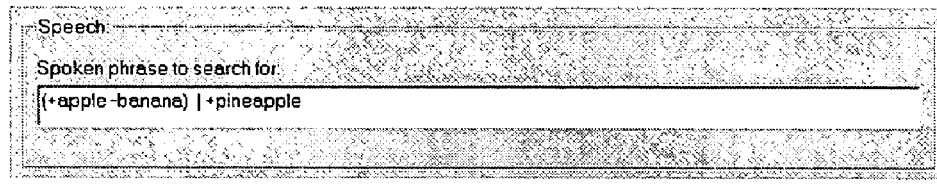

In a preferred embodiment, parentheses are used in a compound search expression to infer precedence and to group expressions together. For example, referring to the expression shown in FIG. 11, without parentheses, the term "apple" must always be found together with either (i) "banana" not found (i.e., absent from the file being searched) OR (ii) "pineapple" found (i.e., present in the file). Using parenthesis as shown in FIG. 12, either (i) "apple" is present and "banana" is not, OR (ii) "pineapple" is present.

Although several basic or elemental operators have been described, others may be defined and used. For example, an exclusive OR operator may be represented by the symbol ⊕ which may logically be defined as:

Phrase1⊕Phrase2=(Phrase1−Phrase2)|(−Phrase1+Phrase2)

In a preferred embodiment, the order of operator precedence is
1. unary operators and parentheses
2. The binary operator Logical OR
3. The implied logical AND between adjacent expressions In this embodiment, operators of the same precedence are evaluated left to right.

Figure 13:
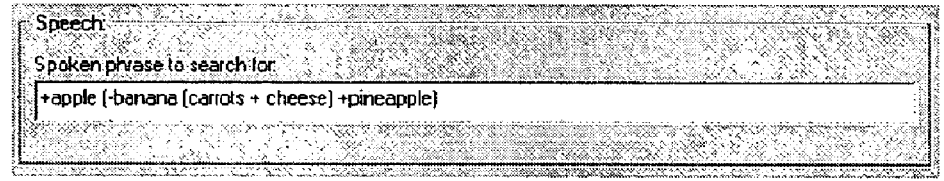

Referring to FIG. 13, parentheses may be used to nest expressions arbitrarily deep as well. The express shown in FIG. 13 evaluates to "apple" and "not banana but carrots and cheese and pineapple".

Permuted Search Expressions

A Permuted search expression is a sequence of search phrases that must be found in order. The search criterion can include an elapsed time between every set of phrases in the sequence.

Permutations of phrases may be defined in Search Grammar Notation using curly "braces", i.e., { }. A permutation is a sequence of search phrases that are separated by commas. The speech engine searches for each phrase in a sequence separately and then exhaustively attempts to test every possible permutation of sequences from the results until it finds one that fits the timing criteria between every set of phrases.

As usual, a search phrase may include an indication of a selected a confidence threshold value or values that limits the range of results just for the specified phrase. In addition, in a preferred embodiment all but the first phrase in a permuted search expression can specify a timing criteria which specifies the number of milliseconds that are allowed between the current phrase and the previous phrase in the permuted search expression using the number or "#" character.

Figure 14:
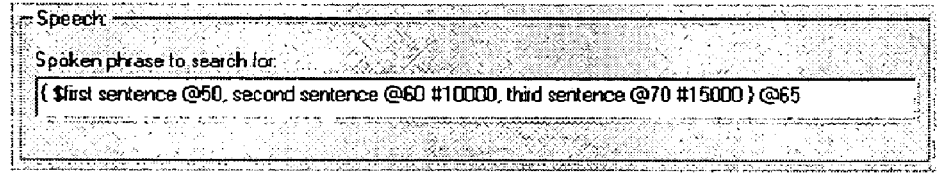

A permuted search expression may be given a final overall confidence score. This may be calculated by finding the minimum confidence score among all search phrases that satisfied the sequence (i.e., those phrases actually relied upon to produce a given result). Phrases that are known to return high confidence matches can be exempted from consideration from overall scoring by prefixing the phrase with a $ character. The overall expression can be constrained by a confidence-threshold which applies to the overall confidence score and may be given outside of the braces { }. For example, with reference to FIG. 14, when a valid permuted sequence is found, it may be committed as though it were a single contiguous search phrase. As depicted, the search is for (i) "first sentence" at confidence of at least 0.50, the actual confidence value to be excluded from the overall score, (ii). search for "second sentence" at confidence 0.60 within 10 seconds of finding "first sentence", (iii). search for "third sentence" at confidence 0.70 within 15 seconds of "second sentence". The overall score threshold is set at 0.65. Resulting sequence is committed as "first sentence second sentence third sentence".

Permutation of Word Sequences in a Phrase

In a preferred embodiment, permutations of words within a phrase are defined in Search Grammar Notation using quotes: " ". The permutation of word sequences using " " uses an implicit technique for segmenting the words in the phrase into multiple, smaller search phrases. Each set of smaller phrases may be searched separately and then the engine may test every permutation of sequence for valid sequences that are in-order chronologically, e.g., in the same order as in the search string definition. This notation may be used for searching for numbers or other text where the segmentation of phrases must be performed dynamically.

Permutation In-Depth

Searching for permutations is accomplished by various embodiments of the invention. A permutation is similar to a combination, the difference between the two being that in a permutation, the order is important. Metaphorically, a permutation can be described in terms of the wheels on a slot-machine. Each wheel has a possible set of outcomes, which may or may not be the same as the other wheels. The task is to find every possible sequence of outcomes across all wheels. Along the same lines, the system according to the invention attempts to find every possible sequence of search-results across all phrases that are given in a search expression.

Figure 15:
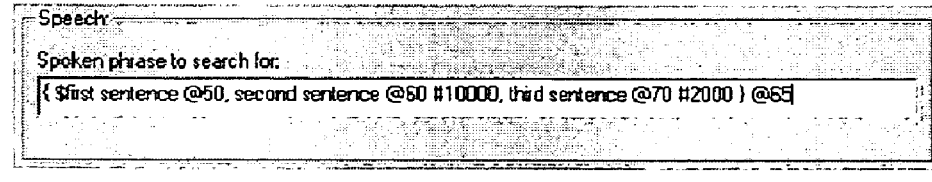

Consider a sample search expression as shown in FIG. 15. In this example there are three search phrases in the sequence: "first sentence", "second sentence", and "third sentence". In a preferred embodiment the system may begin the search for sequences with the first phrase in the sequence, in this case "first sentence". It may begin by searching the call for "first sentence" and constraining the results to only those with a confidence greater than 0.50, as specified in the search expression. Suppose for this example, we get three results back:

| | | |
|---|---|---|
| first sentence | 00:05.0 | 0.65 |
| first sentence | 00:10.0 | 0.68 |
| first sentence | 00:15.0 | 0.70 |

For each result that is returned from the first phrase, the system may search for the second phrase, in this case "second sentence", having a time constraint or time-offset that is found within a given amount of time from the result of the first phrase, in this case 10000 ms (i.e., 10 seconds). Suppose for this example, two results are returned:

| | | |
|---|---|---|
| second sentence | 00:99.0 | 0.72 |
| second sentence | 00:17.0 | 0.68 |

As described above, this embodiment of the invention may begin with the first result from the first phrase found at 00:05.0 (i.e., at 5.0 seconds from the beginning of or some specified reference time in the audio segment being searched). It then may search for a second phrase within 10000 ms of the first. The first result for the second phrase found at 00:99.0 is too distant (i.e, "far away") from the first phrase and is rejected. This is important, since it allows the system to consider search-results that may not necessarily be the highest confidence in a set of results. The second result for the second phrase found at 00:17.0 is also too distant from the first phrase so the whole path [first phrase @00:05.0, second phrase] is found to be rejected.

Since the first result from the first phrase could have ended in a failure to find a sequence, the system backs up and then moves on to the second result from the first phrase, in this case the result found at 00:10.0. It again attempts to find a valid sequence between the first phrase and the second phrase but this time using a different time offset (i.e., using a starting position of 10 seconds as a reference vice 5 seconds). Note that the system operates to remember the results of the previous occurrence in which it searched for "second sentence" and will reuse the results rather than execute another speech-search. In an alternate embodiment in which searching for the second phrase was terminated once beyond the specified time window criteria of 10 seconds, the search may be augmented to complete searching of the newly defined window based on the second occurrence of the first phrase at time 10 seconds. Again, in either case, the first result from the second phrase found at 00:99.0 which is still too far away (e.g., 89 seconds not subtracting for the duration of the first phrase) and is rejected. However, the second result found at 00:17.0 is valid and is kept.

Now that the system has found a potential candidate for the second phrase, it can repeat the process between the second and third search phrase, in this case "third sentence". Starting with the second result of the second phrase found at 00:17.0, the system will perform a speech search on the third phrase and again analyze the set of candidates:

| | | |
|---|---|---|
| third sentence | 00:88.0 | 0.70 |
| third sentence | 00:18.0 | 0.74 |

The result found at 00:88.0 will be rejected because it is not within 2000 ms of the second phrase, but the second result found at 00:18.0 is a valid match. At this point, we have traversed from the beginning of the sequence to the end. This indicates a valid sequence!

Once a valid sequence has been identified, the system designates an overall grade for the search-result and then commits the result. The overall grade may be computed by finding the minimum confidence score for each search-result that composes the valid sequence with the exception of those phrases that are specified to be excluded from the overall score as annotated with a "$" symbol in the search string (as is the case of our first phrase).

In this example, the valid sequence is:

| | | |
|---|---|---|
| first sentence | 00:10.0 | 0.70 |
| second sentence | 00:17.0 | 0.68 |
| third sentence | 00:18.0 | 0.74 |

Therefore the overall score for this search expression may be: 0.68.

Notice that in this example, there is more than one valid sequence. Once the system has found one result, it may still continue to examine all possibilities to compile a list of valid sequences that satisfy the sequence and timing requirements:

| | | |
|---|---|---|
| first sentence | 00:15.0 | 0.70 |
| second sentence | 00:17.0 | 0.68 |
| third sentence | 00:18.0 | 0.74 |

From the examples presented, it will be readily appreciated that many changes and modifications may be made to the invention and to the exemplary embodiment shown and/or described without departing from the spirit or scope of the invention.

Real-World Commercial Deployment

In the typical contact center environment, calls are usually scripted. There exists an inherent and consistent relationship between spoken phrases and exchanges. Specifically, one phrase follows another within a given time frame. If this normal timing is not present, it may indicate an abnormal call or some other aberrational condition. Thus, the present system enables supervisors and agent monitors to create more complex and meaningful queries. For instance:

"Thank you for calling Joe's bank, my name is"+(name of agent who handled call)+"How may I help you"

or . . .

"May I record this conversation" followed within 2 seconds by "yes"

When calls are scripted, or for any call that follows a pattern, the calls may be considered a series of key states, with each state being a phrase that must be articulated or spoken. By analyzing a set of sample calls, a probability distribution of the time between adjacent key states (or phrases) can be determined. A probability distribution (or statistical distribution) may also be determined for the confidence levels returned from the search engine for the phrase that defines a key state. The probability that a search result is the key category of interest may be determined from the confidence level returned from the search engine, and the location within the audio file of the found phrase. A phrase found at a lower relative confidence, exactly where expected, is more likely to be the key state than a phrase at a higher relative confidence in the audio stream where it is not expected. Thus, position of a phrase within a conversation, particularly as may be judged to be consistent with a predefined script, may be used to augment a confidence level that a target phrase has been found and/or that a phrase that has been found is associated with a particular attribute or meaning.

Additionally, in one embodiment of the invention by analyzing a set of sample calls, the statistical distribution of the time between adjacent phrases may be determined. Once this distribution is known, the determination of a confidence may be based on a combination of the confidence returned from the speech engine, and the distance of the phrase from an associated phrase. For example, the probability of having identified a key state is $P(K|x_s,x_o)$ where $P(x_s)$ is the probability of a confidence score and $P(x_o)$ is the probability of the phrase being at the correct offset from a related key state. $P(K|x_s,x_o)$ could be computed using Bayes-Rule where $P(X|Y)=\{P(B|Y)*P(X)\}/P(Y)$. In the preferred embodiment a simple dot product is used for computational efficiency and $P(K|x_s,x_o)$ is computed as $P(xs)*P(xo)$.

The probability of a confidence score S is $P(x_s|S)=g(x_s)$ and the probability of an offset O being correct is $P(x_o|O)=g(x_o)$ where g is any suitable probability function. In the preferred embodiment the function is used and $P(x_s|S)=g(xs,mu,sigma)$ and $P(x_o|O)=$ $g(xo,mu,sigma)$ $$g(x) = \frac{1}{\sigma\sqrt{2\pi}} e^{-\frac{(x-\mu)^2}{2\sigma^2}}$$

The invention claimed is:

1. A system for monitoring a spoken language message comprising:

an interface operational to capture the spoken language message;

a speech processor including a parser operational to implement a search expression syntax to decode a search expression into a number of (i) target search phrases and (ii) rules defining required relationships; and a speech engine operational to search the spoken language message for one or more of said target search phrases and, in response, provides search results identifying a location of any candidate utterances matching said target search phrase together with confidence values indicating a certainty of each of the candidate utterances to corresponding ones of said target search phrases; and said speech processor responsive to said search expression for identifying one or more of said target search phrases to said speech engine and analyzing said search results to determine whether a condition specified by said search expression is satisfied; and a rules processor responsive to template imformation for providing enhanced confidence values based on a combination of respective ones of said search phrase confidence values and said template information.

2. A system according to claim 1 wherein said template information includes context information, said rules processor indicating conformity of said candidate utterances to relationship expectations defined by said template information to provide said enhanced confidence values.

3. A system according to claim 1 wherein the rules processor is operational to determine a statistical distribution of time between adjacent ones of said candidate utterances and a statistical distribution of confidence scores, and determine an enhanced confidence value based on a combination of a probability of the utterance confidence values returned from the speech engine, and a probability of a distance between adjacent candidate utterances.

4. A system according to claim 3 wherein said rules processor calculates a key state probability as $P(K|xs,xo)=P(xs)*P(xo)$ where $P(xs)$ is a probability of a confidence score and $P(xo)$ is a probability of the candidate utterance being at the correct offset from a related key state.

5. A system according to claim 3 wherein said rules processor is operational to determine said probability of a confidence score S as $P(xs|S)=g(xs)$ and said probability of an offset O being correct as $P(xo|O)=g(xo)$ where g is a probability function.

6. A method of monitoring a spoken language message comprising:

capturing the spoken language message using an interface;

parsing, using a search processor, a search expression to implement a search expression syntax and decode said search expression into a number of target search phrases and rules defining required relationships;

searching, using a speech engine, the spoken language message for said target search phases;

providing, using the speech processor, search results including identifying a location of any candidate utterances matching the target search phrases together with confidence values indicating a certainty of each of the candidate utterances to corresponding ones of said target search phrases;

analyzing, using the speech processor, said search results to determine whether a condition specified by said search expression is satisfied; and providing, using a rules processor responsive to template information, an enhanced confidence value based on a combination of respective ones of said utterance confidence values and said template information.

7. A method according to claim 6 wherein said template information includes context information, and said providing enhanced confidence value includes indicating conformity of said candidate utterances to relationship expectations defined by said template information to provide said enhanced confidence value.

8. A method according to claim 6 further including determining, using the speech processor, a statistical distribution of time between adjacent ones of said candidate utterances and determining a statistical distribution of confidence scores, and determining an enhanced confidence value based on a combination of a probability of the utterance confidence values returned from the speech engine, and a probability of a distance between adjacent candidate utterances.

9. A method according to claim 8 further comprising calculating, using the speech processor, a key state probability as $P(K|xs,xo)=P(xs)*P(xo)$ where $P(xs)$ is a probability of a confidence score and $P(xo)$ is a probability of the candidate utterance being at the correct offset from a related key state.

10. A method according to claim 9 wherein said calculating includes determining, using the speech processor, said probability of a confidence score S as $P(xs|S)=g(xs)$ and said probability of an offset O being correct as $P(xo|O)=g(xo)$ where g is a probability function.

* * * * *

UNITED STATES PATENT AND TRADEMARK OFFICE
CERTIFICATE OF CORRECTION

PATENT NO. : 7,584,101 B2  Page 1 of 1
APPLICATION NO. : 10/923038
DATED : September 1, 2009
INVENTOR(S) : Mark et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Fourteenth Day of September, 2010

David J. Kappos
*Director of the United States Patent and Trademark Office*